(12) United States Patent
Yang et al.

(10) Patent No.: US 8,318,334 B2
(45) Date of Patent: Nov. 27, 2012

(54) BATTERY CASING FOR ELECTRICAL DEVICE

(75) Inventors: Wen-Yan Yang, Shenzhen (CN); Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 619 days.

(21) Appl. No.: 12/544,234

(22) Filed: Aug. 20, 2009

(65) Prior Publication Data

US 2010/0112423 A1 May 6, 2010

(30) Foreign Application Priority Data

Oct. 31, 2008 (CN) .......................... 2008 1 0305344

(51) Int. Cl.
    *H01M 2/10* (2006.01)
(52) U.S. Cl. .............................. 429/96; 429/97; 429/100
(58) Field of Classification Search .................... 429/96, 429/97, 98, 99, 100, 175, 178, 179; 396/277, 396/539; 220/843, 844; 439/388, 427, 436, 439/444
    See application file for complete search history.

(56) References Cited

U.S. PATENT DOCUMENTS

| | | | | |
|---|---|---|---|---|
| 1,459,336 A * | 6/1923 | Link | ............................. | 324/426 |
| 3,682,060 A * | 8/1972 | Furuta | ............................. | 396/539 |
| 5,208,116 A * | 5/1993 | Joh | ................................. | 429/96 |
| 5,372,395 A * | 12/1994 | Yang | ............................. | 292/147 |
| 5,567,545 A * | 10/1996 | Murakami | .................... | 429/163 |
| 5,621,618 A * | 4/1997 | Komiyama | ................... | 361/732 |
| 5,882,816 A * | 3/1999 | Gotou | ........................... | 429/100 |
| 5,903,132 A * | 5/1999 | Ohira et al. | ................... | 320/107 |
| 6,093,056 A * | 7/2000 | Donauer et al. | .............. | 439/500 |
| 7,510,796 B2 * | 3/2009 | Tokano | ........................... | 429/96 |
| 7,632,581 B2 * | 12/2009 | Wu et al. | ........................... | 429/1 |
| 7,682,726 B2 * | 3/2010 | Rejman et al. | ................... | 429/97 |
| 7,887,942 B2 * | 2/2011 | Rejman et al. | ................... | 429/97 |
| 8,025,995 B2 * | 9/2011 | Wang | ............................. | 429/97 |
| 8,163,417 B2 * | 4/2012 | Wang | ............................. | 429/100 |
| 2004/0018420 A1 * | 1/2004 | Nakajima et al. | .............. | 429/97 |
| 2007/0026297 A1 * | 2/2007 | Qin et al. | ......................... | 429/97 |
| 2008/0063928 A1 * | 3/2008 | Lin | ................................. | 429/97 |
| 2008/0248376 A1 * | 10/2008 | Rejman et al. | ................... | 429/97 |
| 2010/0026609 A1 * | 2/2010 | Otsuki et al. | ....................... | 345/8 |
| 2010/0112422 A1 * | 5/2010 | Wang | ............................. | 429/96 |
| 2011/0008663 A1 * | 1/2011 | Liu | ................................. | 429/96 |
| 2011/0070473 A1 * | 3/2011 | Chen et al. | ..................... | 429/100 |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

A battery casing used in an electrical device includes a box body, an electric sheet, a resilient electric portion and a switch apparatus. The box body for receiving a battery has a first sidewall and a second sidewall opposite to the first sidewall. The electric sheet mounted on an inner surface of the first sidewall is capable of electrically connecting with a first electrode of the battery. The resilient electric portion mounted on an inner surface of the second sidewall is capable of electrically connecting with a second electrode of the battery, and compressible to generate restoring forces. The switch apparatus mounted on an outer side of the first sidewall switches between a first position and a second position. When the switch apparatus is in the first position, the first electrode of the battery is detached from the electric sheet.

16 Claims, 6 Drawing Sheets

BATTERY CASING FOR ELECTRICAL DEVICE

BACKGROUND

1. Technical Field

The present disclosure relates to battery casings, and particularly to a battery casing used in an electrical device, with a switch apparatus for connecting or disconnecting an electrical connection between batteries received in the battery casing and other electrical components of the electrical device.

2. Description of Related Art

Electronic devices usually use batteries as power source for providing convenient uses at unlimited locations, wherein the batteries are usually received in battery casings of the electronic devices. However, users do not have the habit of removing the batteries out of the electronic devices when not using the electronic devices. The batteries may still supply electrical power to partial electronic components of the electronic devices, thus lives of the electronic devices may be shortened.

Therefore, a battery casing for a potable electrical device capable of connecting or disconnecting an electrical connection between batteries received in the battery casing and other electrical components received in the electrical device is desired.

DETAILED DESCRIPTION

Figure 1:
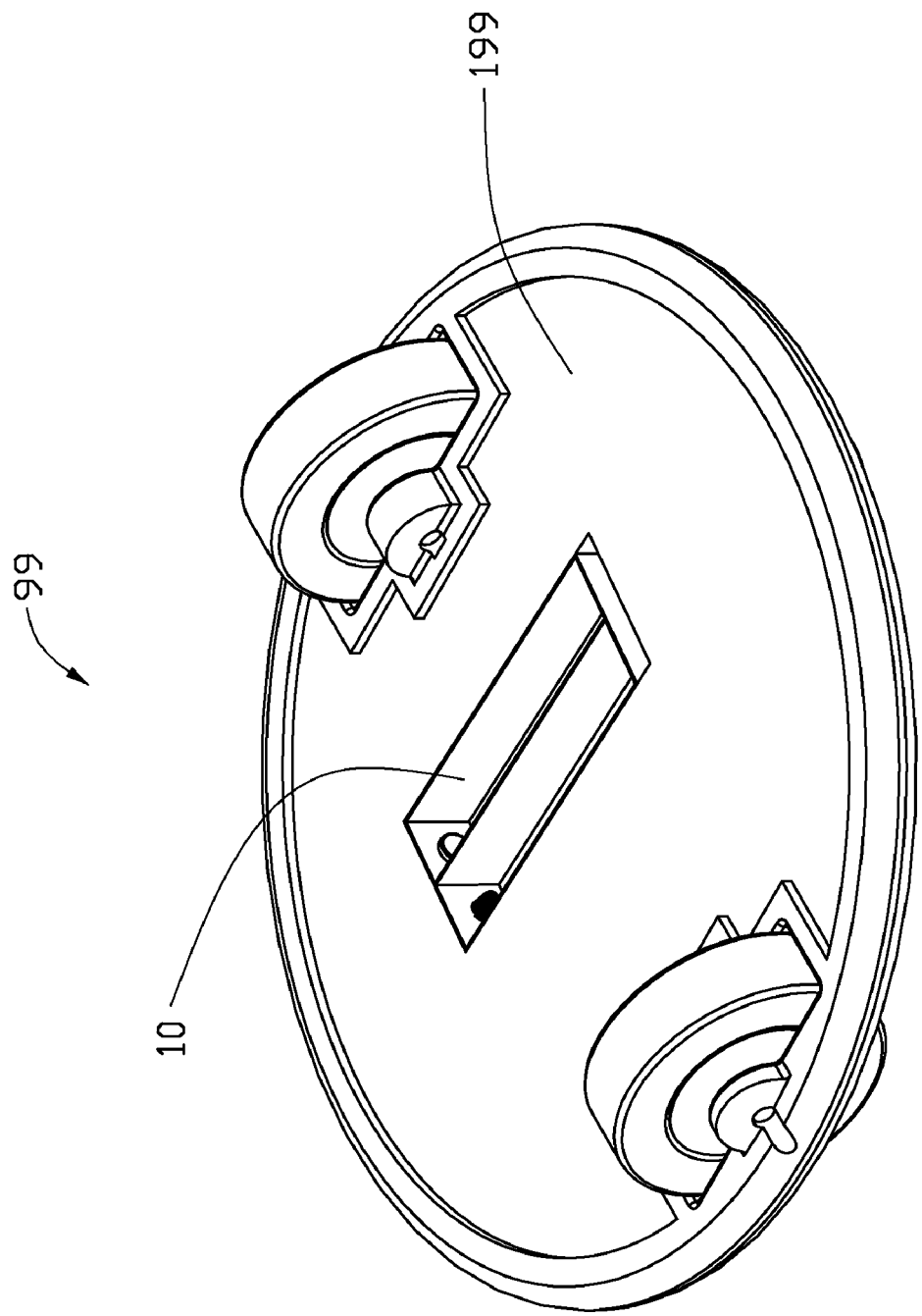
FIG. 1 is an isometric view of an electrical device with a battery casing in accordance with an exemplary embodiment.

Referring to FIG. 1, an electrical device 99 using a battery power source is provided. The electrical device 99 includes a shell 199 and a battery casing 10 received in the shell 199.

Figure 2:
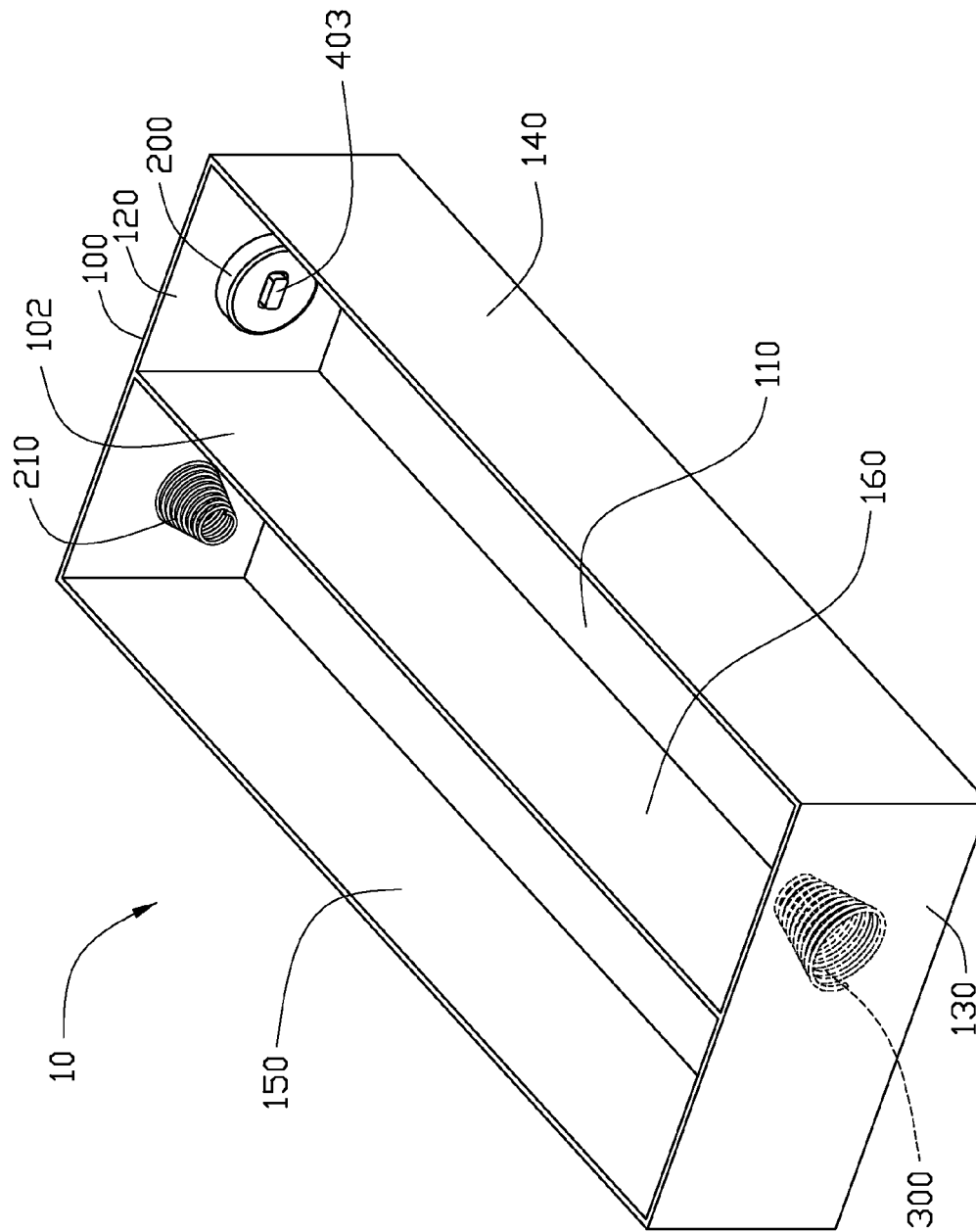
FIG. 2 is an isometric view of a battery casing in FIG. 1.
Figure 3:
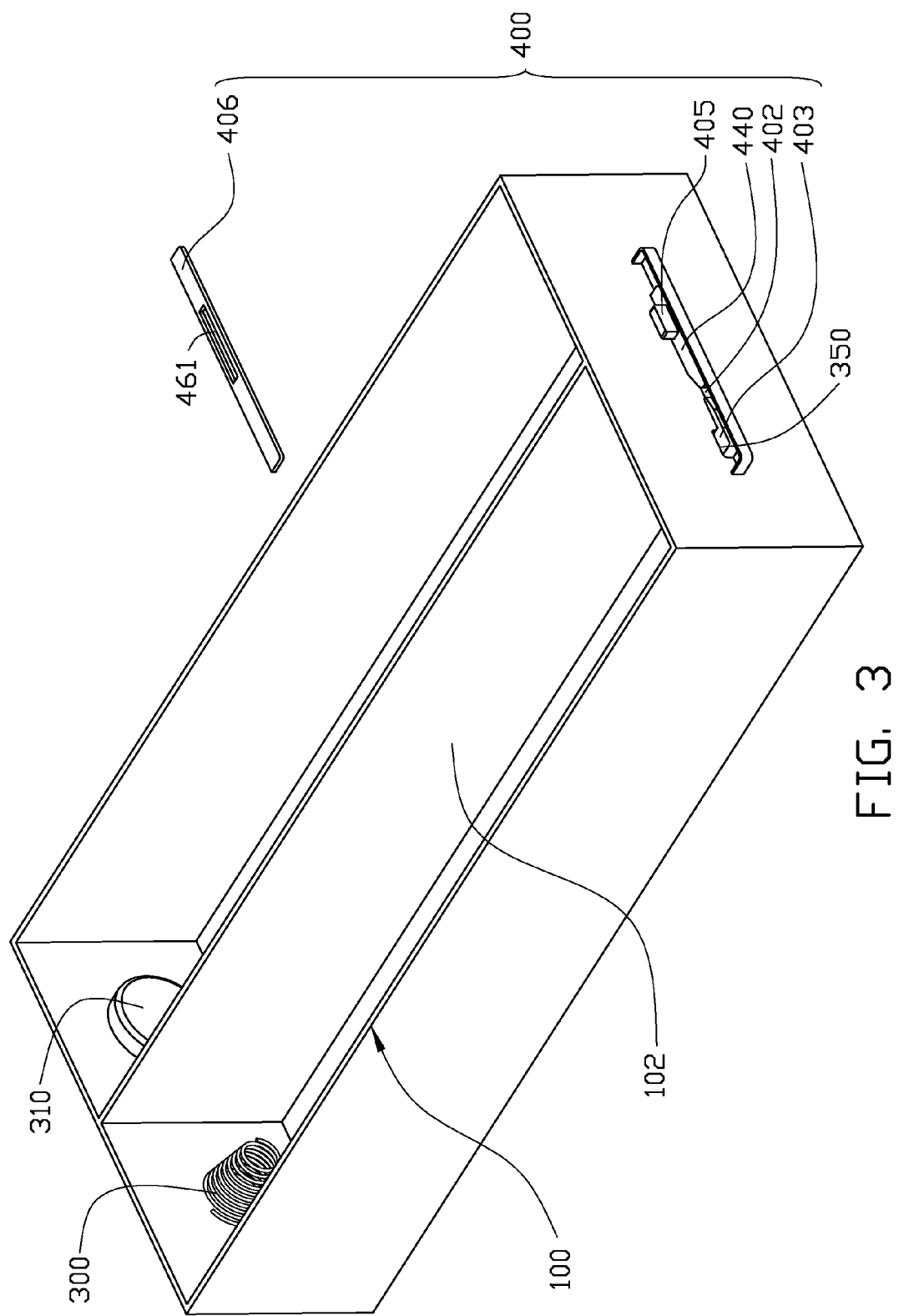
FIG. 3 is an exploded view of the battery casing in FIG. 2.
Figure 4:
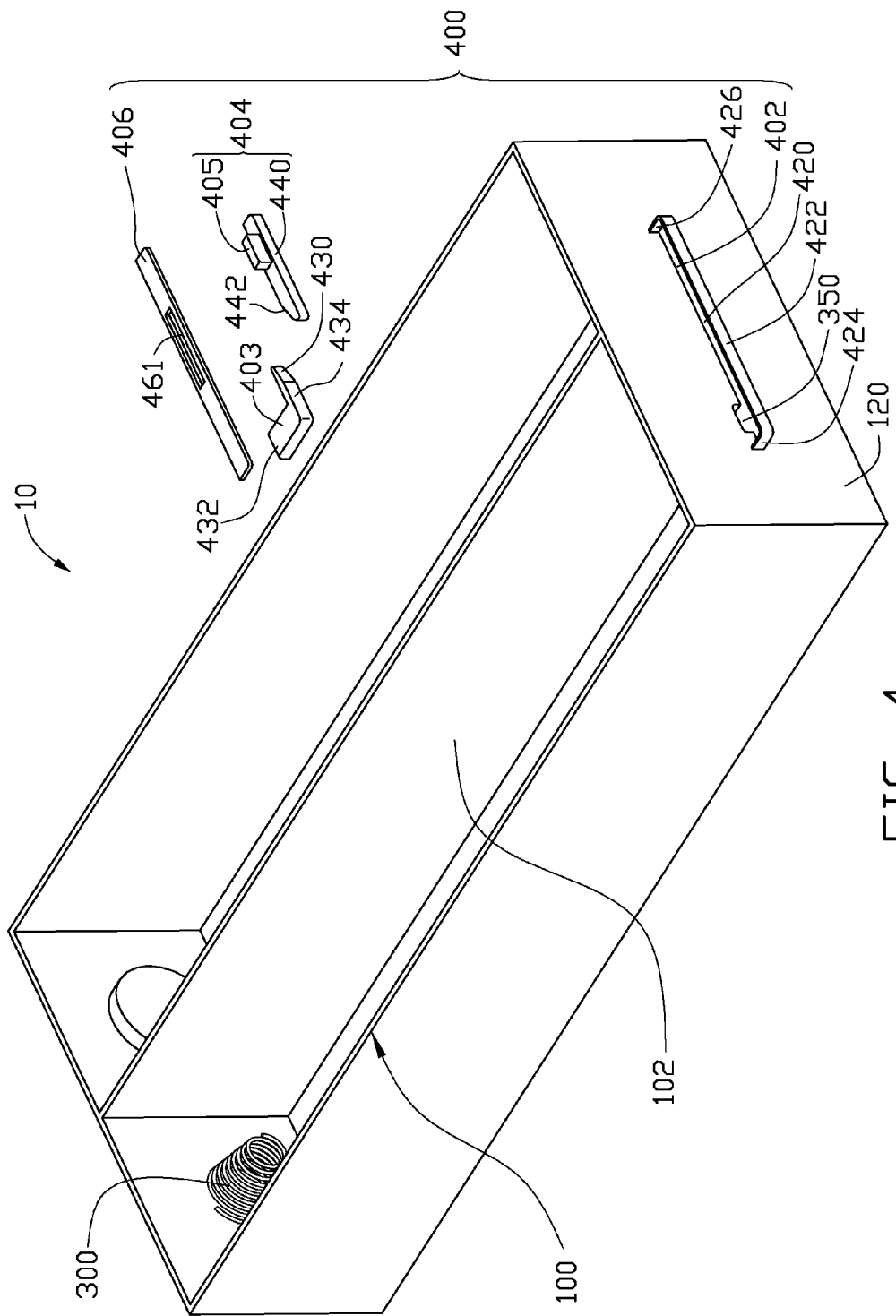
FIG. 4 is a further exploded view of the battery casing in FIG. 3.

Referring to FIGS. 2 to 4, the battery casing 10 includes a box body 100 for accommodating the batteries, and a switch apparatus 400 mounted on the box body 100. The switch apparatus 400 is configured for connecting or disconnecting an electrical connection between the batteries and any other electrical components of the electrical device.

The box body 100 includes a rectangular base board 110, and further includes a first sidewall 120, a second sidewall 130, a third sidewall 140, and a fourth sidewall 150 extending upwards from four edges of the base board 110 correspondingly. The first sidewall 120, the third sidewall 140, the second sidewall 130 and the fourth sidewall 150 are interconnected with each other. The base board 110 and the four sidewalls 120, 140, 130, 150 cooperatively form a receiving space 102.

A partition board 160 extends upwards from the base board 110. The partition board 160 is parallel to the third sidewall 140 and the fourth sidewall 150, and arranged between the third sidewall 140 and the fourth sidewall 150. The partition board 160 perpendicularly connects between the first sidewall 120 and the second sidewall 130, thus the receiving space 102 is divided into two parts.

A first electric sheet 200 and a first resilient electric portion 210 are arranged on the first sidewall 120. A second resilient electric portion 300 and a second electric sheet 310 are arranged on the second sidewall 130. The first electric sheet 200 and the second resilient electric portion 300 are on one side of the partition wall 160. The first resilient electric portion 210 and the second electric sheet 310 are on another side of the partition wall 160. The first electric sheet 200 and the second resilient portion 300 are electrically connected with input ends of the other electrical components of the electrical device 99 correspondingly. The electric sheets 200, 310 may be circular. The resilient electric portions 210, 300 may be tapered springs.

A through hole 350 is defined in the box body 100 through the first sidewall 120 and the first electric sheet 200.

The switch apparatus 400 is arranged on an outer side of the first sidewall 120. The switch apparatus 400 includes a rectangular platform 420, a first baffle 422, a second baffle 424, and a third baffle 426. The platform 420 protrudes from the outer side of the first sidewall 120, parallel to the base board 110. The first baffle 422, the second baffle 424, and a third baffle 426 extend upwards from three edges of the platform 420. The first baffle 422 is parallel to the first sidewall 120. The second baffle 424 and the third baffle 426 connects between the first sidewall 120 and the first baffle 422. The platform 420, the first sidewall 120, the first baffle 422, the second baffle 424 and the third baffle 426 cooperatively form a rectangular receiving slot 402. The receiving slot 402 communicates with the receiving space 102 via the through hole 350.

The switch apparatus 400 also includes a moveable member 403, made of non-conductive material, a driving member 404, and a lid 406. The moveable member 403 and the driving member 404 are received in the receiving slot 402. The lid 406 covers on the receiving slot 402. The moveable member 403 includes a contact portion 432 and a wedge portion 434 connecting with one end of the contact portion 432. A free end of the contact portion 432 is capable of extending into the receiving space 102 after passing through the through hole 350. The wedge portion 434 may be substantially perpendicular to the contact portion 432, and includes a first inclined surface 430 at an end surface facing the driving member 404.

The driving member 404 includes a base portion 440 and a handle 405 mounted on the base portion 440. The base portion 440 may be bar shape. The base portion 440 has a second inclined surface 442 at an end surface facing the moveable member 403. The second inclined surface 442 is configured for moving against the first inclined surface 430 of the wedge portion 434 to push the moveable member 403. The handle 405 may be rectangular. The lid 406 is similar with the receiving slot 402 in shape. The lid 406 defines an elongated opening 461. The handle 405 passes through the opening 461 and operable by users. The handle 405 is slidable in the opening 461.

Figure 5:
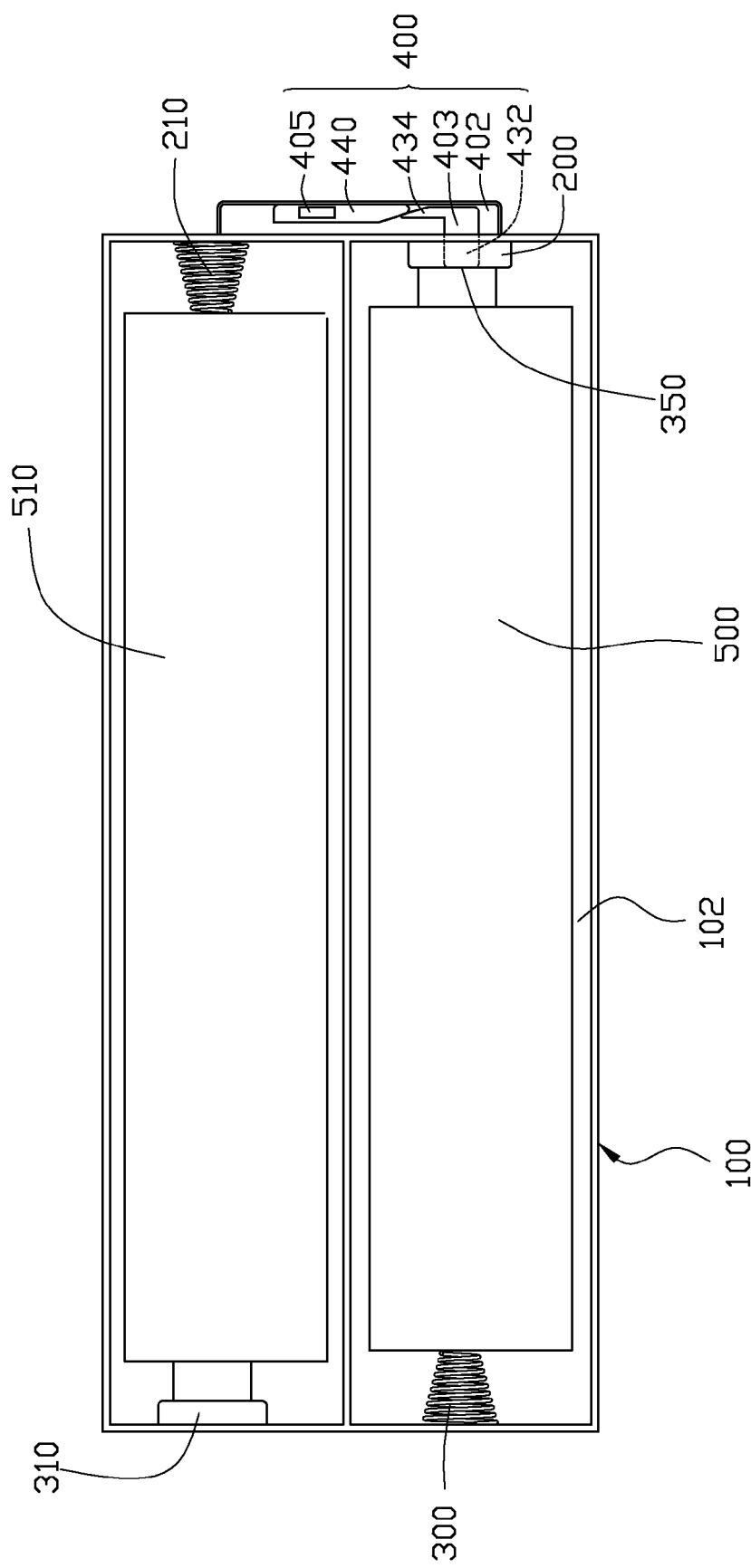
FIG. 5 is a schematic, top view of the battery casing in FIG. 2 in one state.
Figure 6:
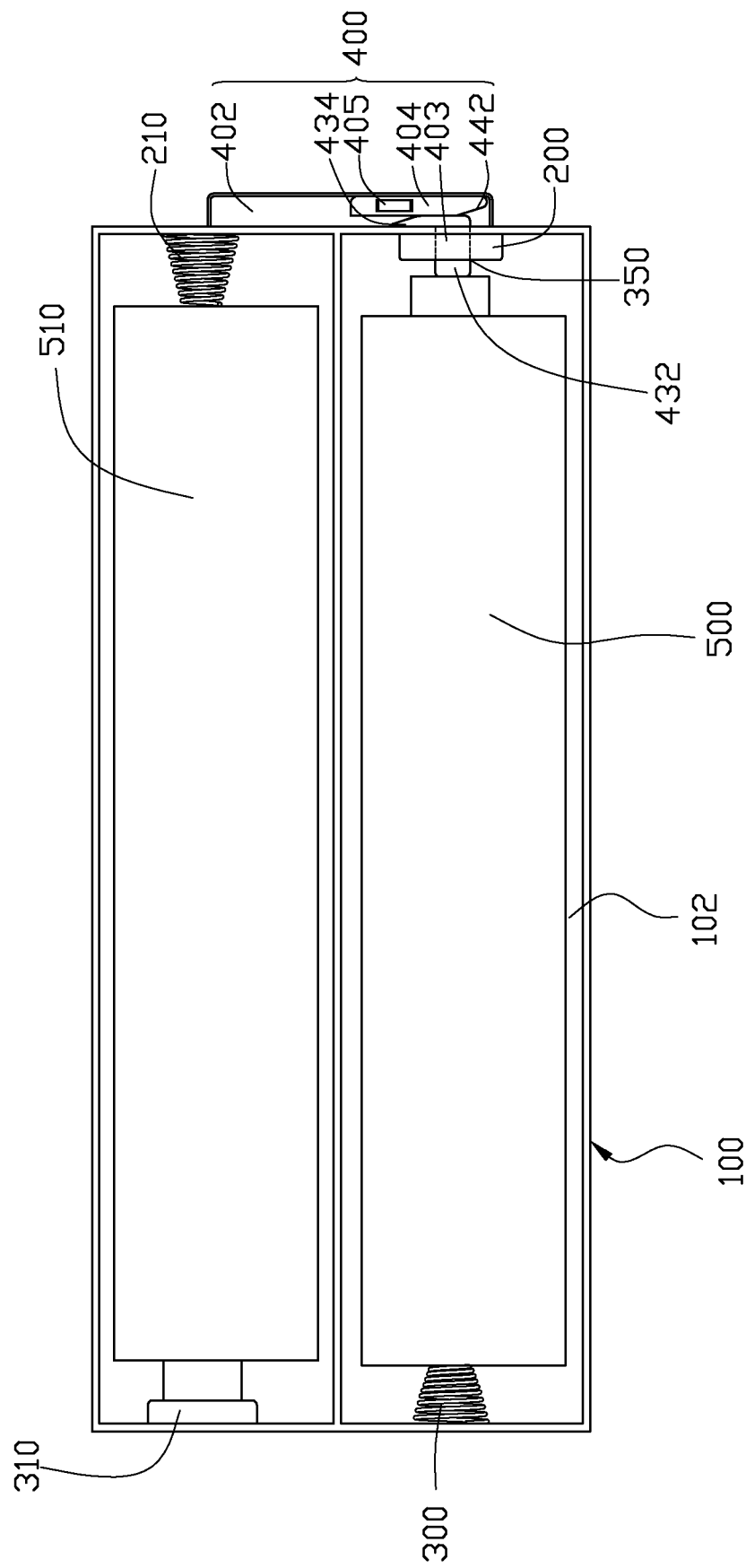
FIG. 6 is a schematic, top view of the battery casing in FIG. 2 in another state.

Referring to FIG. 5, in use, two batteries 500, 510 are received in the two parts of the receiving space 102 correspondingly. The battery 500 is electrically connected between the first electric sheet 200 and the second resilient electric portion 300; the battery 510 is electrically connected between the first resilient electric portion 210 and the second electric sheet 310.

When the batteries 500, 510 are not in use, an external force is applied on the handle 500 to push the driving member 404 to move towards the movable member 403. The driving member 404 then extrudes the wedge portion 434, thus the contact portion 432 moves into the receiving space 102 via the through hole 350 and pushes the battery 500 to move toward the second resilient electric portion 300. Therefore, the battery 500 detaches from the first electric sheet 200. In other words, an electrical connection between the battery 500 and the first electric sheet 200 is disconnected (referring to FIG. 5), as a result, an electrical connection between the batteries and any other electrical components of the electrical device is disconnected. Meanwhile, the driving member 404 is sandwiched between the movable member 403 and the first baffle 422. The second resilient electric portion 300 is compressed to generate restoring forces.

If the batteries 500, 510 need to be used again, an external force is applied in the handle 405 to push the driving member 404 to move away from the movable member 403. The battery 500 moves towards the first electric sheet 200 and contacts the first electric sheet 200 via the restoring forces generated by the second resilient electric portion 300. The electrical connection between the battery 500 and other electrical components in the electrical device 10 is connected; the batteries 500, 510 thus can supply electrical power to the electrical components.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A battery casing for an electrical device comprising:
a box body configured for receiving a battery therein, the box body having a first sidewall and a second sidewall opposite to the first sidewall;
an electric sheet mounted on an inner surface of the first sidewall, and capable of electrically connecting with a first electrode of the battery;
a resilient electric portion mounted on an inner surface of the second sidewall, and capable of electrically connecting with a second electrode of the battery, and compressible to generate restoring forces; and
a switch apparatus mounted on an outer side of the first sidewall, the switch apparatus being switchable between a first position and a second position;
wherein, the box body defines a through hole running through the first sidewall and the electric sheet, the switch apparatus comprises a moveable member slidable in the through hole, the moveable member is capable of moving towards the resilient electric portion and pushing the first electrode of the battery to detach the first electrode of the battery from the electric sheet, when the switch apparatus is in the first position, the first electrode of the battery is detached from the electric sheet; when the switch apparatus is in the second position, the first electrode of the battery contacts the electric sheet.

2. The battery casing according to claim 1, wherein the switch apparatus comprises a platform extending from the outer side of the first sidewall and a first baffle extending upwards from the first sidewall, the first baffle is parallel to the first sidewall, combination of the first sidewall, the platform, and the first baffle forms a receiving slot; the receiving slot communicating with the through hole; the switch apparatus further comprises a driving member received in the receiving slot, the driving member is configured to move against the moveable member and can extrude the moveable member to move towards the resilient electric portion, the driving member is sandwiched between the moveable member and the first baffle when the switch apparatus is in the first position.

3. The battery casing according to claim 2, wherein the battery will move towards the electric sheet and contact the electric sheet via the restoring forces generated by the resilient electric portion when the driving member change from being sandwiched between the first baffle and the moveable member to being slid away from the movable member.

4. The battery casing according to claim 2, wherein the switch apparatus further comprises a base body and a handle mounted on the base body.

5. The battery casing according to claim 4, wherein the switch apparatus further comprise a lid for covering on the receiving slot while exposing the handle.

6. The battery casing according to claim 5, wherein the lid defines an elongated opening for the handle to slide therein.

7. The battery casing according to claim 4, wherein the moveable member comprises a contact portion and a wedge portion extending from the contact portion, the base body has an inclined surface being held against an inclined surface of the wedge portion.

8. A battery casing for an electrical device comprising:
a box body having a first sidewall and a second sidewall opposite to the first sidewall;
an electric sheet mounted on an inner surface of the first sidewall;
a resilient electric portion mounted on an inner surface of the second sidewall; and
a switch apparatus mounted on an outer side of the first sidewall;
wherein the box body defines a through hole running through the first sidewall and the electric sheet, the switch apparatus comprises a moveable portion configured for moving in the through hole and protruding out of the electric sheet.

9. The battery casing according to claim 8, wherein the switch apparatus comprises a platform protruding from the outer side of the first sidewall and a first baffle extending upwards from the first sidewall, combination of the first sidewall, the platform, the first baffle forms a receiving slot communicating with the through hole, the moveable member comprises a contact portion moveable in the through hole and a wedge portion extending from the contact portion received in the receiving slot.

10. The battery casing according to claim 9, wherein the switch apparatus further comprises a driving member received in the receiving slot, the driving member has an inclined surface for moving against an inclined surface of the wedge portion.

11. The battery casing according to claim 10, wherein the driving member comprises a base body and a handle mounted on the base body, the inclined surface of the driving member is formed on the base body facing the wedge portion.

12. The battery casing according to claim 9, wherein the switch apparatus further comprises a lid covering on the receiving slot and exposing the handle.

13. The battery casing according to claim 9, wherein the switch apparatus further comprises a second baffle and a third baffle upwardly extending form the platform; the second baffle and the third baffle connected between the first sidewall and the first baffle, and the second baffle and the third baffle are arranged at opposite ends of the platform.

14. An electrical device comprising:

a shell; and a battery casing received in the shell comprising:

a box body configured for receiving a battery therein, the box body having a first sidewall and a second sidewall opposite to the first sidewall;

an electric sheet mounted on an inner surface of the first sidewall, and capable of electrically connecting with a first electrode of the battery;

a resilient electric portion mounted on an inner surface of the second sidewall, and capable of electrically connecting with a second electrode of the battery, and compressible to generate restoring forces; and a switch apparatus mounted on an outer side of the first sidewall, the switch apparatus being switchable between a first position and a second position;

wherein, the box body defines a through hole running through the first sidewall and the electric sheet, the switch apparatus comprises a moveable member slidable in the through hole, the moveable member is capable of moving towards the resilient electric portion and pushing the first electrode of the battery to detach the first electrode of the battery from the electric sheet, the first electrode of the battery detaches from the electric sheet when the switch apparatus is in the first position; the first electrode of the battery contacts the electric sheet when the switch apparatus is in the second position.

15. The electrical device according to claim 14, wherein the switch apparatus comprises a platform extending from the outer side of the first sidewall and a first baffle extending upwards from the first sidewall, the first baffle is parallel to the first sidewall, combination of the first sidewall, the platform, and the first baffle forms a receiving slot; the receiving slot communicating with the through hole; the switch apparatus further comprises a driving member received in the receiving slot, the driving member is configure to move against the moveable member and can extrude the moveable member to move towards the resilient electric portion, the driving member is sandwiched between the moveable member and the first baffle when the switch apparatus is in the first position.

16. The electrical device according to claim 15, wherein the battery will move towards the electric sheet and contact the electric sheet via the restoring forces generated by the resilient electric portion when the driving member change from being sandwiched between the first baffle and the moveable member to being slid away from the movable member.

\* \* \* \* \*